(12) United States Patent
Imbert et al.

(10) Patent No.: US 9,169,892 B2
(45) Date of Patent: Oct. 27, 2015

(54) MECHANICAL CONNECTION DEVICE

(71) Applicant: Airbus Operations (SAS), Toulouse (FR)

(72) Inventors: Nicolas Imbert, Toulouse (FR); Wofgang Brochard, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 14/529,553

(22) Filed: Oct. 31, 2014

(65) Prior Publication Data

US 2015/0115098 A1    Apr. 30, 2015

(30) Foreign Application Priority Data

Oct. 31, 2013 (FR) ...................... 13 60683

(51) Int. Cl.
| | |
|---|---|
| *B64D 27/26* | (2006.01) |
| *F16F 13/00* | (2006.01) |
| *F16F 13/04* | (2006.01) |
| *F16F 1/04* | (2006.01) |
| *F16F 15/067* | (2006.01) |
| *F16F 1/12* | (2006.01) |

(52) U.S. Cl.
CPC .............. *F16F 13/005* (2013.01); *B64D 27/26* (2013.01); *F16F 1/04* (2013.01); *F16F 1/128* (2013.01); *F16F 13/04* (2013.01); *F16F 15/067* (2013.01); *B64D 2027/262* (2013.01)

(58) Field of Classification Search
CPC .......................... B64D 26/27; B64D 2027/262
USPC ........................................................ 244/54
See application file for complete search history.

(56) References Cited

U.S. PATENT DOCUMENTS

| | | | | |
|---|---|---|---|---|
| 1,025,785 | A | * | 5/1912 | Coffin ................................ 213/2 |
| 2,469,118 | A | * | 5/1949 | Kinne et al. ..................... 213/19 |
| 2011/0278778 | A1 | * | 11/2011 | Qattan .......................... 267/151 |

FOREIGN PATENT DOCUMENTS

| | | |
|---|---|---|
| DE | 3713620 | 1/1988 |
| EP | 0068151 | 1/1983 |
| FR | 2986844 | 8/2013 |

OTHER PUBLICATIONS

French Search Report, Aug. 26, 2014.

* cited by examiner

*Primary Examiner* — Justin Benedik
(74) *Attorney, Agent, or Firm* — Greer, Burns & Crain, Ltd.

(57) ABSTRACT

An aircraft comprising a mechanical connection device including a body that extends along a longitudinal axis. The body comprises two opposite end portions disposed along the longitudinal axis and adapted to receive external axial loads in compression and in tension, a spring member that is adapted to be compressed axially, and a mechanism which, in the event of external axial loads in compression or in tension on the end portions, is able to transmit to the spring member compression forces oriented in opposite directions according to whether the external axial loads are in compression or in tension. This device forms a flexible connection that accommodates equally well external loads in compression and in tension.

16 Claims, 6 Drawing Sheets

MECHANICAL CONNECTION DEVICE

CROSS-REFERENCES TO RELATED APPLICATIONS

This application claims the benefit of the French patent application No. 1360683 filed on Oct. 31, 2013, the entire disclosures of which are incorporated herein by way of reference.

BACKGROUND OF THE INVENTION

The invention concerns a mechanical connection device in an aircraft.

Mechanical connection devices between two parts of a structure such as an aircraft are known.

These devices are subjected to external compression and/or tension loads by the parts that they connect to each other.

These devices must therefore be configured and/or sized accordingly in order to be able to accommodate such external loads without being damaged.

It would be useful to design a new mechanical connection device that can be subjected to external compression and tension loads without being damaged.

SUMMARY OF THE INVENTION

In this regard, in accordance with a first aspect, the invention provides an aircraft that includes at least one mechanical connection device including a body that extends along a longitudinal axis, the body comprising:
  two opposite end portions disposed along the longitudinal axis and adapted to receive external axial loads in compression and in tension,
  at least one spring member that is adapted to be compressed axially,
  a mechanism which, in the event of external axial loads in compression or in tension on the two end portions, is able to transmit to said at least one spring member compression forces oriented in opposite directions according to whether the external axial loads are in compression or in tension.

This device thus forms a flexible connection that can accept equally well external loads in compression or in tension.

This device is designed so that at least one spring member (housed in the body) is compressed by the action of external compression and/or tension stresses that are transmitted by an internal mechanism.

Such a flexible connection makes it possible to modify the modal response and the dynamic behavior of the assembly of the two parts (external to the device) connected to each other by the device when acted on by vibratory loads.

In accordance with other features considered separately or in combination with one another:
  said at least one spring member also has a shock absorber function;
  said at least one spring member comprises at least one axial compression spring;
  said at least one spring member comprises two axial compression springs mounted concentrically inside the body;
  each axial spring is formed of a stack of friction spring elements each having the shape of a ring;
  said at least one spring member comprises at least one flexible and shock absorbing material (of elastomer, natural rubber, silicone, etc. type) element;
  the body comprises two mobile parts aligned axially with each other and between which is axially arranged said at least one spring member, a first end portion of the body being mobile axially when acted on by external axial loads in compression and in tension and including a piston mobile axially inside the body and a peripheral contact area around the piston, the first end portion being adapted to transmit:
    an axial compression force to a first of the two mobile parts via the peripheral contact area when said first end portion is subjected to an external axial load in compression,
    an axial tension force to the second mobile part via the piston when said first end portion is subjected to an external axial load in tension;
  the so-called central piston passes through the central portion of the two mobile parts, said at least one spring member being arranged around this central portion and the central piston, the central piston including at its free end a head that is shaped to cooperate with the second mobile part and to exert an axial tension force thereon in the direction of the first mobile part when the first end portion is subjected to an external axial load in tension;
  the body defines an axial internal housing and includes two opposite end walls spaced from each other along the longitudinal axis and disposed transversely, the internal housing receiving between the two end walls the two mobile parts, said at least one spring member and the piston, at least one shock absorber element being disposed between each end wall and the facing mobile part;
  at least one of the two opposite end portions includes at least one yoke;
  the device includes, inside the body, elements that are adapted to limit or to eliminate impacts between the parts of the mechanism on changing from a tension load to a compression load and vice-versa;
  the device is equipped with a system of internal abutment (s) that is adapted to create a transfer of (high) force greater than the vibratory forces (with a high stiffness) when the internal abutment or abutments is or are loaded by parts of the mechanism;
  the system of internal abutment(s) includes said at least one shock absorber element.

Such a device incorporated into an aircraft notably makes it possible to replace rigid connection devices such as rigid links.

In accordance with one possible feature, the aircraft includes an engine pylon structure, said at least one mechanical connection device forming a mechanical attachment between the engine pylon primary structure and at least one of the following elements of the aircraft: engine, fuselage, wings, tail unit.

In accordance with other possible features:
  in the case of external axial loads in compression, the head of the central piston is adapted to come into contact with a first shock absorber element disposed between a first end wall and the facing second mobile part and in contact with each of them.
  in the case of external axial loads in tension, the central portion of the second mobile part is adapted to come into contact with the central portion of the first mobile part, therefore moving the first mobile part axially so that a second shock absorber element disposed between a second end wall and the facing first mobile part is in contact with each of them.

In accordance with another possible feature, said at least one mechanical connection device is adapted to modify the dynamic response of the engine pylon primary structure in the event of vibrations generated by the engine following accidental blade loss.

BRIEF DESCRIPTION OF THE DRAWINGS

Other features and advantages will become apparent in the course of the following description, given by way of nonlimiting example only and with reference to the appended drawings, in which.

DETAILED DESCRIPTION OF THE PREFERRED EMBODIMENTS

Figure 1:
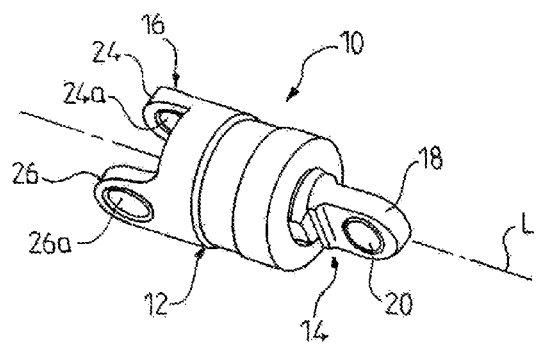
FIG. 1 is a diagrammatic general view in perspective of a connection device in accordance with a first embodiment of the invention.

As represented in FIG. 1, a connection device 10 includes a body 12 of elongate general shape and circular cross section that extends along a longitudinal axis L.

The body 12 includes two opposite end portions 14, 16 that are disposed along the longitudinal axis L at a distance from each other.

The first end portion 14 includes a main yoke 18 provided with a ball joint connection 20 that is perpendicular to the longitudinal dimension of the yoke.

The second end portion 16 includes twin yokes 24, 26 disposed facing each other and offset transversely relative to the longitudinal axis. The orifices 24a, 26a through the two yokes are face to face.

Figure 2A:
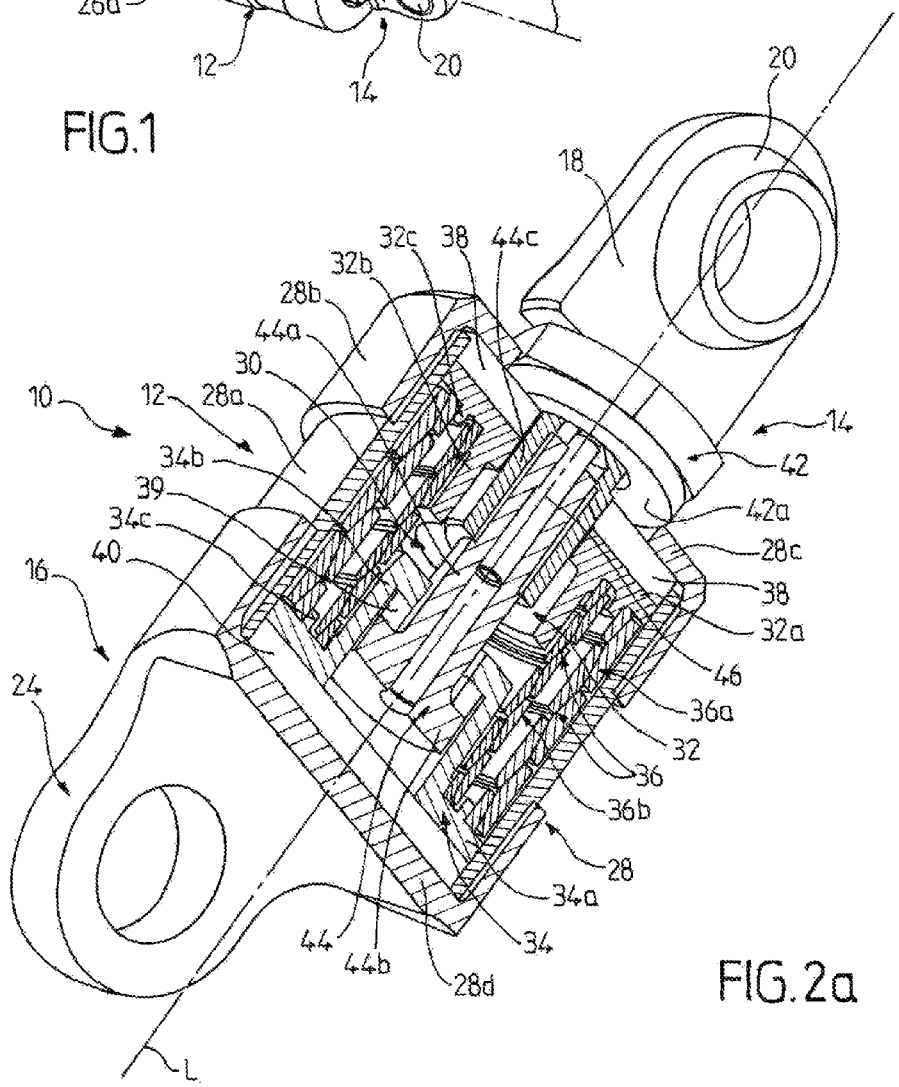
FIG. 2a is a diagrammatic cutaway view in perspective of the device from FIG. 1 (the plane of the cutaway being an axial plane)

As represented in FIG. 2a, the body 12 includes an external casing 28 that defines an internal housing 30 extending axially along the longitudinal axis L.

The external casing 28 of the body 12 comprises a plurality of elements fixed to one another:

a central wall 28a of cylindrical shape that extends axially along the longitudinal axis L, two hoods or caps disposed at the two opposite ends of the central wall 28a and that respectively cap its two opposite ends, thus leaving uncovered a central portion in the form of a strip.

One of the caps corresponds to the second end portion 16. The two caps are screwed onto the central wall 28a.

Each cap includes a transverse wall that is an end wall 28c, 28d of the internal housing 30.

Thus the housing 30 is defined by the axially extending wall 28a and the two transverse end walls 28c, 28d.

The end wall 28c is pierced axially to enable a portion of the first end portion 14 that is described later to pass through it.

The internal housing 30 encloses:

two axially mobile parts 32, 34 that are aligned with respect to each other along the longitudinal axis L, at least one spring member 36 that is arranged between the two parts 32, 34 and in contact with them.

Said at least one spring member 36 bears on each of these two parts.

Each part 32, 34 bears in turn against a shock absorber element 38, 40, for example in the form of a metal disk, disposed against the respective end wall 28c, 28d.

The two parts 32, 34 are both perforated in their central portion aligned along the longitudinal axis L in order to receive the aforementioned portion of the first end portion 14.

As represented in FIG. 2a, the first part 32 includes a peripheral base 32a disposed transversely inside the central wall 28a and a central portion 32b. The central portion 32b has transverse dimensions smaller than those of the base 32a and extends axially away from said base in the direction of the second part 34.

A central hole through the whole of the part 32 has its diameter increased inside the central portion 32b in order to form an internal shoulder.

The second part 34 has the general shape of a hat and includes a peripheral base 34a disposed transversely inside the central wall 28a and a central portion 34b. The central portion 34b has transverse dimensions smaller than those of the base 34a and extends axially away from said base and in the direction of the part 32.

A central hole through the whole of the part 34 has a diameter that is constant inside the central portion 34b and smaller at the open end of said central portion 34b in order to form an internal shoulder.

The respective bases and central portions of the two parts 32, 34 are aligned with one other along the axis L and have the same transverse dimensions.

The first end portion 14 includes a hollow first portion 42 that is arranged in a central hole in the end wall 28c of the cap 28b and a peripheral area 42a which bears against the shock absorber element 38. The first portion 42 is disposed between the shock absorber element 38 and the yoke 18. The first portion 42 forms an element for adjusting the position of the first end portion 14 on the body 12. This adjustment is effected by screwing this first end portion 14, a portion of the external surface of which is threaded, inside the first portion 42, which is threaded in a complementary manner.

The first end portion 14 also includes a second portion 44 connected to the yoke 18, passing through the hollow first portion 42 and extending axially inside the housing 30.

The second portion 44 includes a central piston that includes a rod 44a and, at its free end, a head 44b.

The rod 44a is mounted at its base inside a sheath 44c that is fastened to the yoke 18 and forms an axial extension thereof.

The sheath 44c has an outside diameter that matches that of the hole in the base 32a.

The rod 44a is held in a fixed position inside the sheath 44c by means of an immobilizing element 46 such as a screw that is screwed into the body of the second portion 44 and presses on the rod 44a.

The rod 44a passes axially through the respective central holes of the two parts 32 and 34.

The head 44b of the piston is inside the central portion 34b and is retained therein by the internal shoulder of said central portion.

The central piston 44 is therefore shaped to cooperate with the second part 34.

In the position shown in FIG. 2a, the shoulder of the head 44b bears on a third shock absorber element 39 in the form of a ring that is disposed against the shoulder inside the central portion 34b.

As will emerge later, the first end portion 14 is mobile axially inside the internal housing 30.

In this embodiment said at least one spring member 36 comprises two axial compression springs 36a (external), 36b (internal) that are mounted coaxially with respect to each other.

Figure 2B:
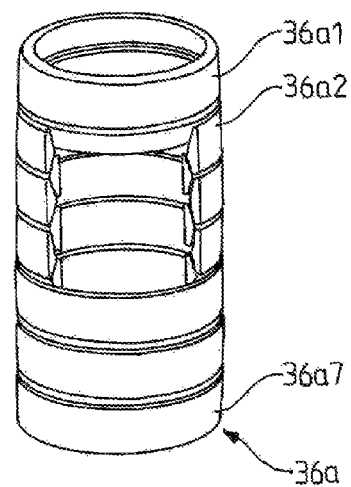
FIG. 2b is a perspective view of a stack of friction spring elements in the form of rings.

The external spring 36a and the internal spring 36b each comprise a stack of friction spring elements, each of which is in the form of a ring. As represented in FIG. 2b, the spring 36a (like the spring 36b) is formed by a set of rings 36a1-a7 juxtaposed in an offset manner.

These two stacks of spring elements are mounted in the annular housing delimited by the bases 32a and 34a of the two parts 32 and 34, their central portions 32b and 34b and the central wall 28a. To be more specific, the exterior surface of the spring 36a is adjacent the central wall 28a and the interior surface of the spring 36b is adjacent the central portions 32b and 34b.

A peripheral rib 32c, 34c is provided on each base to locate each stack and to separate it from the other stack.

These spring members 36a, 36b provide a connection that is both flexible (with a low stiffness) and absorbs shock (due to the rubbing or friction created between the various rings).

These spring members are adapted to be compressed axially along the longitudinal axis L by whatever type of axial force (compression or tension) is applied to the device 10.

FIGS. 3a-d described hereinafter illustrate the operation of the device 10 from FIGS. 1 and 2 when it is subjected to axial compression and tension stresses by the parts that the device connects.

For clarity, only a few reference numbers are repeated in FIGS. 3a-d.

Figure 3A:
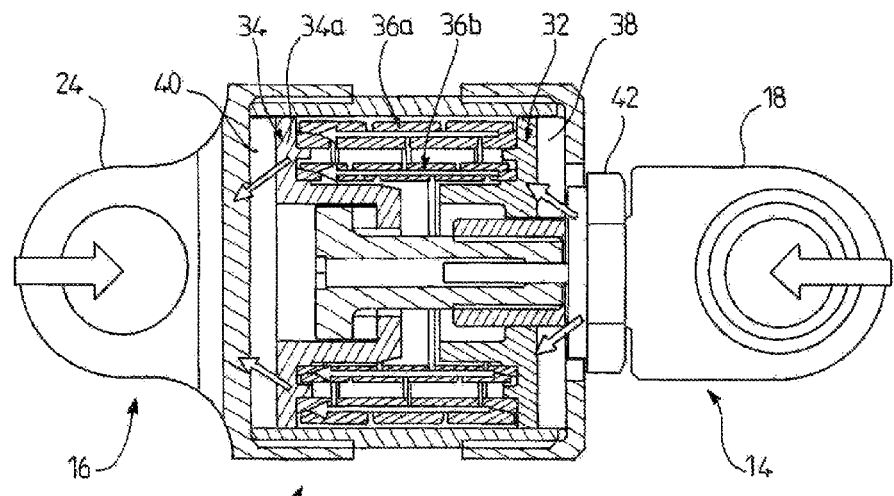
FIGS. 3a to 3d illustrate the transmission of forces inside the device from FIG. 2a in different situations.

In FIG. 3a, axial external stresses in compression symbolized by the arrows directed toward each other are transmitted to the connection device 10 and follow the path indicated by the arrows inside the device.

The axial compression stress exerted on the main yoke 18 of the first end portion 14 causes movement thereof. The stress is transmitted successively, via the peripheral area 42a of the first portion 42, to the shock absorber element 38, the first part 32 and the spring members 36a, 36b, which are compressed axially.

The spring members apply this stress to the second part 34 which in turn transmits it to the shock absorber element 40 and to the cap bearing the yokes 24 and 26 of the second end portion 16.

In return, the second end portion exerts a force on the longitudinal axis of the part.

Figure 3B:
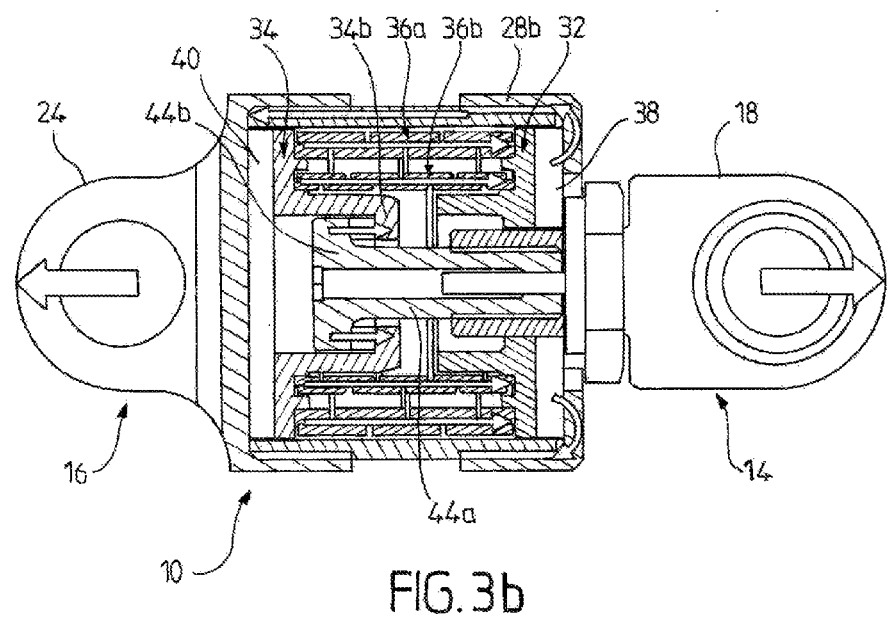

In FIG. 3b, axial external stresses in tension symbolized by the arrows directed away from each other are exerted on the connection device 10 and follow the path indicated by the arrows inside the device.

The effect of the tension force exerted on the main yoke 18 is to exert tension on the central piston, the head 44b of which transmits the tension forces to the second part 34.

The second part 34 is therefore drawn toward the right in the figure (in the direction of the first part 32) and axially compresses the spring members 36a, 36b, which transmit the stress to the first part 32.

In turn, the first part 32 transmits the stress to the end cap 28b of the main yoke, which retransmits it via the external casing of the body to the cap bearing the yokes 24 and 26 of the second end portion 16.

Figure 3C:
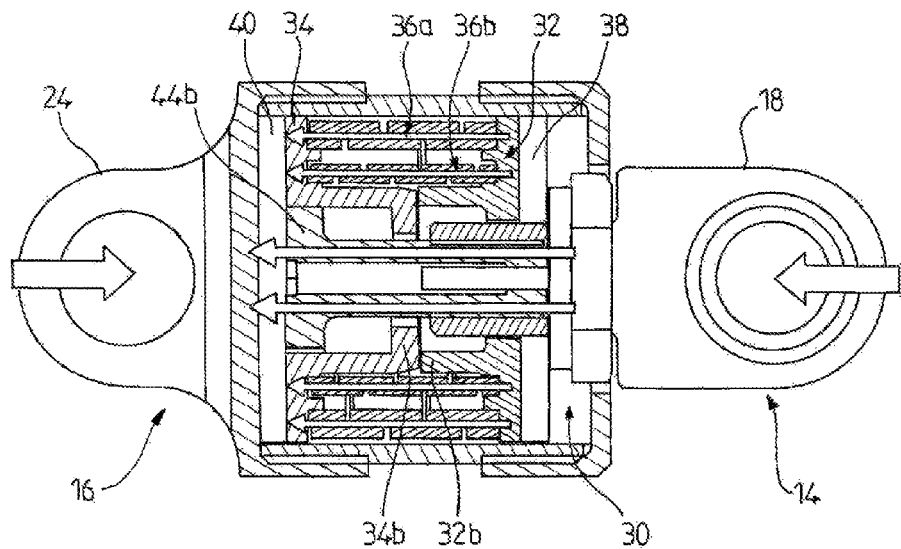
Figure 3D:
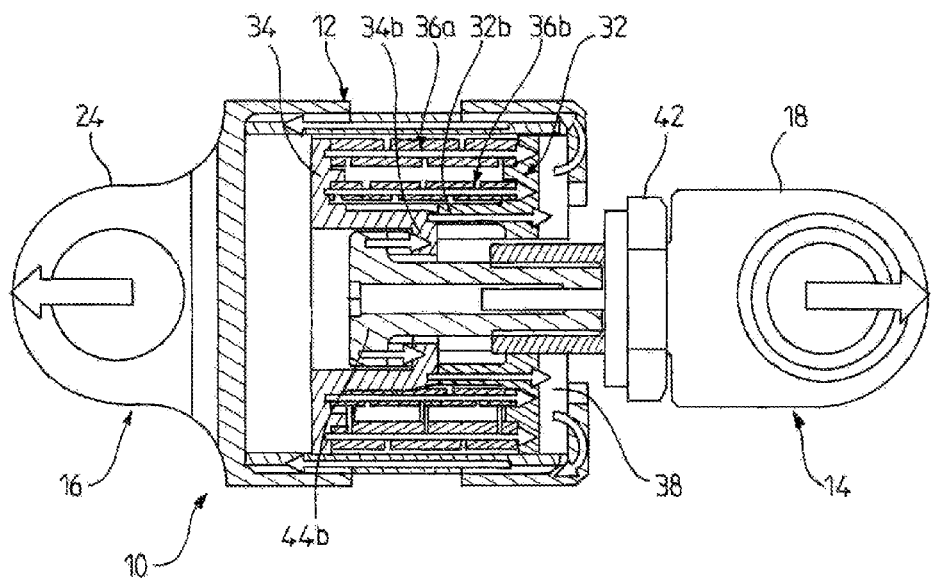

FIGS. 3a and 3b each illustrate a so-called flexible mode of operation that enables the attachment to have a low stiffness. This mode of operation is therefore defined for a range of forces in tension and in compression that is specific and similar to the level of vibrational force. If the forces applied are greater than the vibrational forces, the mechanism comes into a situation of abutment, as represented in FIGS. 3c and 3d, and goes to a so-called rigid mode. The internal abutments are the shock absorber elements 38 and 40 referred to above, which form an internal abutment system.

High axial compression stresses (FIG. 3c) push the central piston of the first portion 14 into the internal housing 30. The head 44b of the piston comes into contact with the shock absorber element 40 (for example a disk-shaped shock absorber pad) and the force is therefore transmitted to the cap bearing the yokes 24 and 26.

The axial compression stresses exerted on the main yoke 18 are also transmitted to the cap bearing the yokes 24 and 26 successively via the shock absorber element 38, the first part 32, the spring members 36a, 36b, which are compressed, the second part 34 and the shock absorber element 40.

It will be noted that in this position (FIG. 3c) there is an axial clearance between the facing open ends of the two central portions 32b and 34b in order to prevent peening of these two parts.

High axial stresses in tension (FIG. 3d) pull the central piston of the first end part out of the internal housing 30 (toward the right in the figure).

The head 44b of the piston is moved axially in the direction of the first part 32 and entrains the second part 34 with it via its shoulder inside the central portion 34b.

The central portion 34b comes to bear against the central portion 32b and the spring members 36a, 36b are compressed axially, therefore transmitting the forces to the first part 32 and to the cap bearing the yokes 24 and 26 via the same path as that shown in FIG. 3b. The first end portion 14 moves away from the body 12.

As explained above, the connection device 10 is therefore particularly suitable for providing a reliable, flexible and shock-absorbing connection when it is subjected even to very high axial stresses in compression and in tension (FIGS. 3c and 3d).

This is made possible by its construction and its internal mechanism that enables one or more spring members to be compressed axially whether the external stresses are in compression or in tension.

Such a device makes it possible to modify the modal response of the system on which it is mounted in order to attenuate the levels of vibration and acceleration to which the structures may be subjected.

It will be noted that the spring members may be sized differently.

Accordingly, the number of rings to be stacked may vary as a function of the levels of force and stiffness to be achieved.

The number and shape of the spring members may also vary as a function of the stresses to which the device is liable to be subjected and the dynamic behavior that is expected of this device.

In accordance with a variant embodiment that is not represented, the spring member or members is or are elements made from a flexible and shock-absorbing material, for example of elastomer, natural rubber, silicone, etc. type.

The body 12 of the device may have a different shape and the shape of the internal housing 30 may notably vary and have a cross section that is not circular but, for example, square or rectangular.

Moreover, the external casing of the body may alternatively be made in one piece instead of three parts (28a, 28b and 16).

Alternatively, a single yoke aligned with the main yoke 18 may be provided on the cap of the second end portion 16 instead of the two yokes 24, 26.

Figure 4:
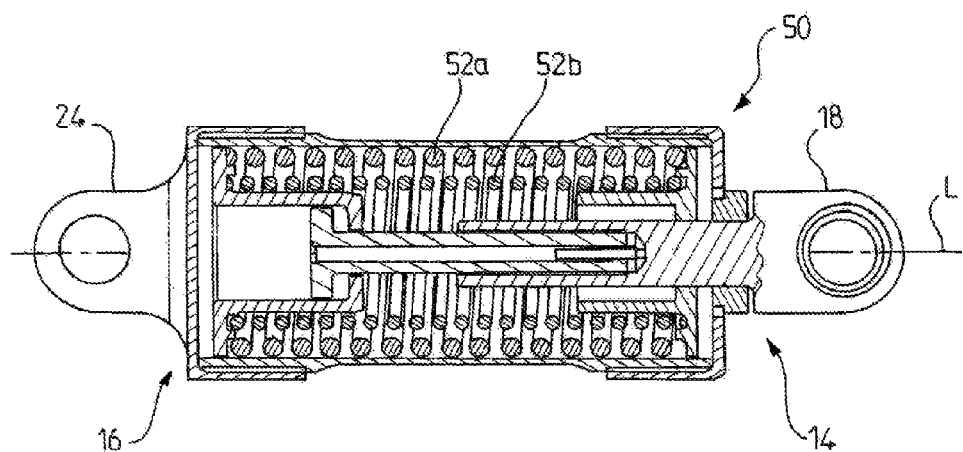
FIG. 4 is a diagrammatic view in axial section of a connection device in accordance with a second embodiment of the invention.

FIG. 4 shows a connection device 50 in accordance with a second embodiment of the invention.

This device provides only a flexible connection (stiffness) with no shock absorber effect.

The device 50 comprises a structure virtually identical to that of the device 10 with the exception of the spring members.

In fact, the spring members 36a, 36b of the device 10 are replaced here by two coil springs 52a (external spring), 52b (internal spring) mounted coaxially around the longitudinal axis L of the device.

This device behaves as described with reference to FIGS. 3a-d.

Figure 5:
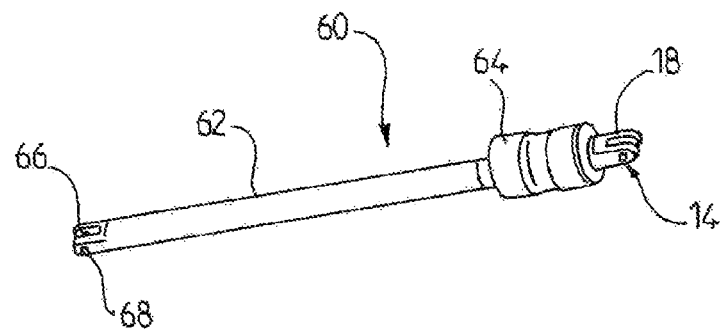
FIG. 5 is a diagrammatic general view in perspective of a connection device in accordance with a third embodiment of the invention used as a strut.

FIG. 5 shows a connection device 60 in accordance with a third embodiment of the invention.

This device differs from the preceding ones in its external structure. Its internal structure may be that of the devices 10 or 50 or a variant thereof The device 60 again includes the main yoke 18 of the first end portion 14.

However, the second end portion is modified: the cap bearing the two yokes 24 and 26 in FIGS. 1 to 3 is replaced by a link 62 fixed, for example welded, to the end cap 64 of the body. This link 62 carries at its free end twin yokes 66, 68 analogous to the yokes 24, 26 but offset relative to the latter.

The device 60 therefore forms a strut.

The connection devices of the preceding embodiments are particularly suitable, notably because of their internal mechanism, for the stresses encountered on board an aircraft and that do not exist on board other mobile machines such as motor vehicles, trains, etc. In particular, such devices are particularly suitable for resisting the levels of acceleration to which aircraft are subjected (notably on take-off) and the variations of temperatures and pressure cause by changes of altitude.

These connection devices also have the advantage of being neither too heavy nor too bulky.

Figure 6:
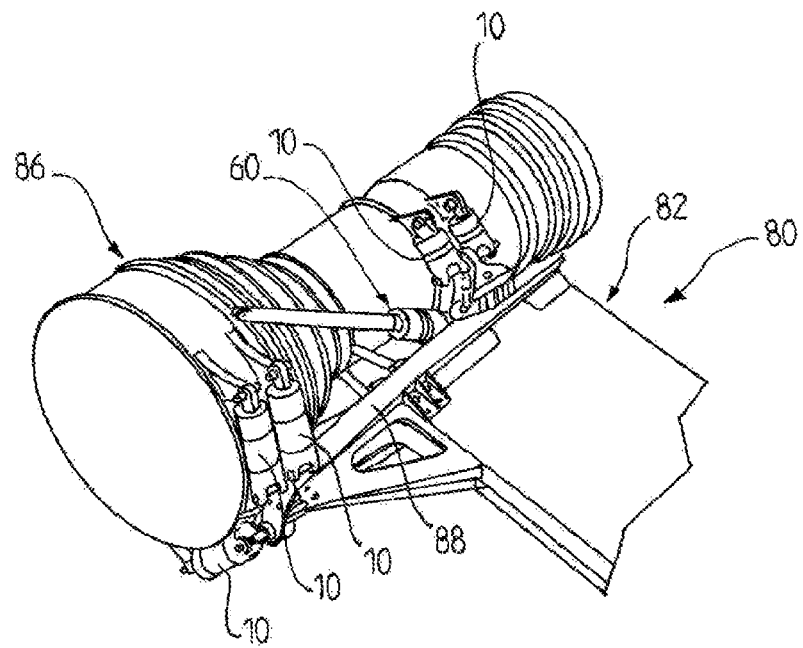
FIG. 6 is a diagrammatic perspective view showing the installation in an aircraft of connection devices in accordance with the three embodiments of the invention referred to above.
Figure 7:
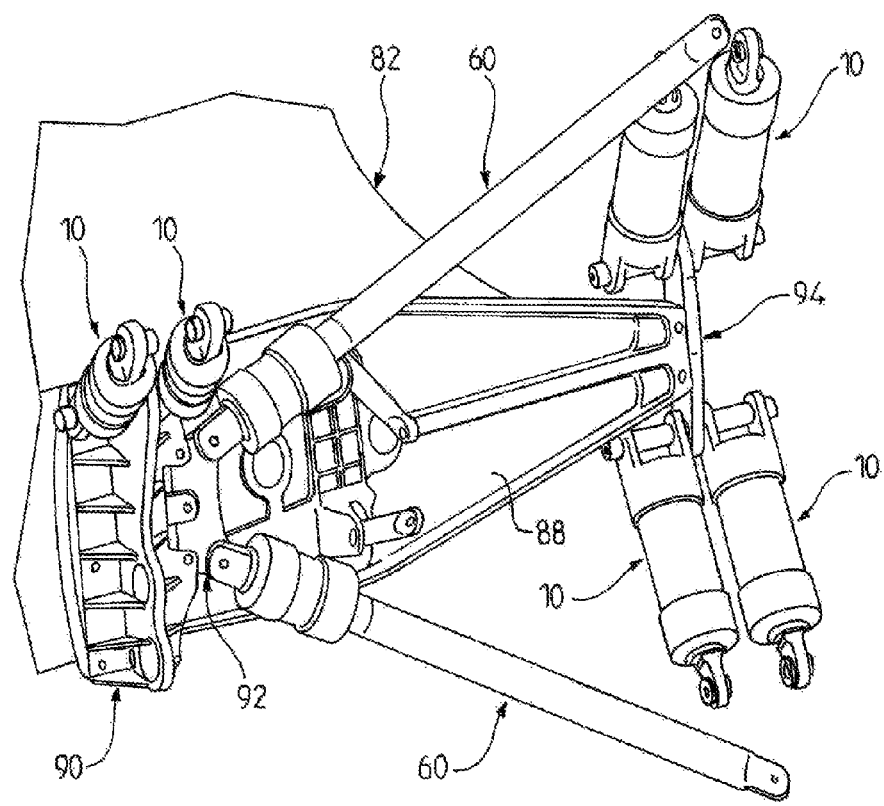
FIG. 7 is a diagrammatic perspective view of the installation in an aircraft of the devices from FIG. 5 as seen from a different angle and with the engine removed.

FIGS. 6 and 7 illustrate the use of the connection devices of the foregoing embodiments on an aircraft 80 of which only a portion is represented.

The aircraft 80 includes an engine pylon primary structure 82 connected to a fuselage (not represented).

The aircraft 80 also includes an engine 86 (FIG. 6) the frame of which is connected to the engine pylon primary structure 82 by means of a set of mechanical connection elements.

Thus the set of mechanical connection elements comprises a plurality of mechanical connection devices 10 of the first embodiment and mechanical connection devices 60 of the third embodiment.

FIG. 7, which is a view from the other side, at the wing end (without the engine 86), shows the integration of the devices to a part 88 known as the engine spar.

The devices are integrated onto parts such as fittings 90, 92 fixed to the engine spar 88 or to a part such as an interface part 94 between the primary structure and the engine mounts. This is a plate of "flexible" metal such as titanium, for example.

The use of the devices in accordance with the invention as attachments between an aircraft engine and the engine pylon primary structure enables static loads to be transmitted to the primary structure and the levels of dynamic load and acceleration on the latter to be reduced.

These devices therefore notably make it possible to modify the dynamic response of the engine pylon primary structure and therefore of the aircraft in the event of vibrations generated by the engine following accidental blade loss.

These devices are particularly suitable for aircraft with contra-rotating propellers.

These devices can advantageously replace rigid connection devices in an aircraft such as rigid links.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft comprising at least one mechanical connection device including a body that extends along a longitudinal axis, the body comprising:
   two opposite end portions disposed along the longitudinal axis and adapted to receive external axial loads in compression and in tension;
   at least one spring member adapted to be compressed axially;
   a mechanism which, in the event of external axial loads in compression or in tension on the end portions, is configured to transmit to said at least one spring member compression forces oriented in opposite directions according to whether the external axial loads are in a compression condition or in a tension condition;
   two mobile parts aligned axially with each other and between which is axially arranged said at least one spring member,
   a first end portion of the body which is axially mobile when acted on by external axial loads in compression and in tension and including a central piston axially mobile inside the body and a peripheral contact area around the piston,
   the first end portion transmitting:
     an axial compression force to a first mobile part of the two mobile parts via the peripheral contact area when said first end portion is subjected to the external axial load in the compression condition,
     an axial tension force to the second mobile part via the piston when said first end portion is subjected to the external axial load in the tension condition.

2. The aircraft according to claim 1, wherein said at least one spring member also comprises a shock absorber.

3. The aircraft according to claim 1, wherein said at least one spring member comprises at least one axial compression spring.

4. The aircraft according to claim 3, wherein said at least one spring member comprises two axial compression springs mounted concentrically inside the body.

5. The aircraft according to claim 4, wherein each axial spring is formed of a stack of friction spring elements, each element having the shape of a ring.

6. The aircraft according to claim 2, wherein said at least one spring member comprises at least one flexible and shock absorbing material element.

7. The aircraft according to claim 1, wherein the central piston passes through a central portion of the two mobile parts, said at least one spring member being arranged around the central portion and the central piston, the central piston including, at a free end thereof, a head that is shaped to cooperate with the second mobile part and to exert an axial tension force thereon in the direction of the first mobile part when the first end portion is subjected to an external axial load in tension.

8. The aircraft according to claim 1, wherein the body defines an axial internal housing and includes two opposite end walls spaced from each other along the longitudinal axis and disposed transversely, the internal housing receiving between the two end walls the two mobile parts, said at least one spring member and the piston, at least one shock absorber element being disposed between each end wall and the facing mobile part.

9. The aircraft according to claim 1, wherein at least one end portion of the two opposite end portions includes at least one yoke.

10. The aircraft according to claim 1, wherein the device includes, inside the body, elements that are adapted to one of limit and eliminate impacts between the parts of the mechanism on changing from a tension load to a compression load and vice-versa.

11. The aircraft according to claim 1, wherein the device is equipped with a system of at least one internal abutment that is adapted to create a transfer of forces greater than vibratory forces when the internal abutment is loaded by parts of the mechanism.

12. The aircraft according to claim 8, wherein the system of at least one internal abutment includes said at least one shock absorber element.

13. The aircraft according to claim 7, wherein the system of at least one internal abutment includes said at least one shock absorber element, and wherein, in the case of external axial loads in compression, the head of the central piston is adapted to come into contact with a first shock absorber element disposed between a first end wall and the facing second mobile part and in contact with each of them.

14. The aircraft according to claim 7, wherein the system of at least one internal abutment includes said at least one shock absorber element, and wherein, in the case of external axial loads in tension, the central portion of the second mobile part is adapted to come into contact with the central portion of the first mobile part, therefore moving the first mobile part axially so that a second shock absorber element disposed between a second end wall and the facing first mobile part is in contact with each of them.

15. The aircraft according to claim 1, further comprising an engine pylon primary structure, said at least one mechanical connection device forming a mechanical attachment between the engine pylon primary structure and at least one of the following elements of the aircraft: engine, fuselage, wings, tail unit.

16. The aircraft according to claim 15, wherein said at least one mechanical connection device is adapted to modify the dynamic response of the engine pylon primary structure in the event of vibrations generated by the engine following accidental blade loss.

* * * * *